June 5, 1928.

A. C. HAYDEN 1,672,214

FILM REEL

Filed May 13, 1927

Inventor:
Arthur C. Hayden
By Henry T. Williams
Attorney

Patented June 5, 1928.

1,672,214

UNITED STATES PATENT OFFICE.

ARTHUR C. HAYDEN, OF BROCKTON, MASSACHUSETTS.

FILM REEL.

Application filed May 13, 1927. Serial No. 191,049.

The invention to be hereinafter described relates to film reels for motion picture apparatus. It is desirable to provide suitable means for holding the free ends of the films to the reels in order that they may not project outward beyond the reels and be liable to become torn and injured in handling.

It is found that the film expands and contracts under temperature changes. A purpose of the invention, therefore, is to provide means for holding the free end of the film on the reel with provision to allow for expansion and contraction of the film and at the same time to hold the free end portion of the film taut under all conditions.

Films have series of small holes at intervals adjacent the edges thereof for cooperation with toothed wheels in the film feed mechanism of the motion picture projector. Another purpose of the invention is to provide means for holding the free end of the film on the reel having prongs or elements for entry into a pair of said holes thereby to provide positive connection of the holding means with the film and enable ready connection of the holding means with the film and detachment therefrom.

Figure 1:
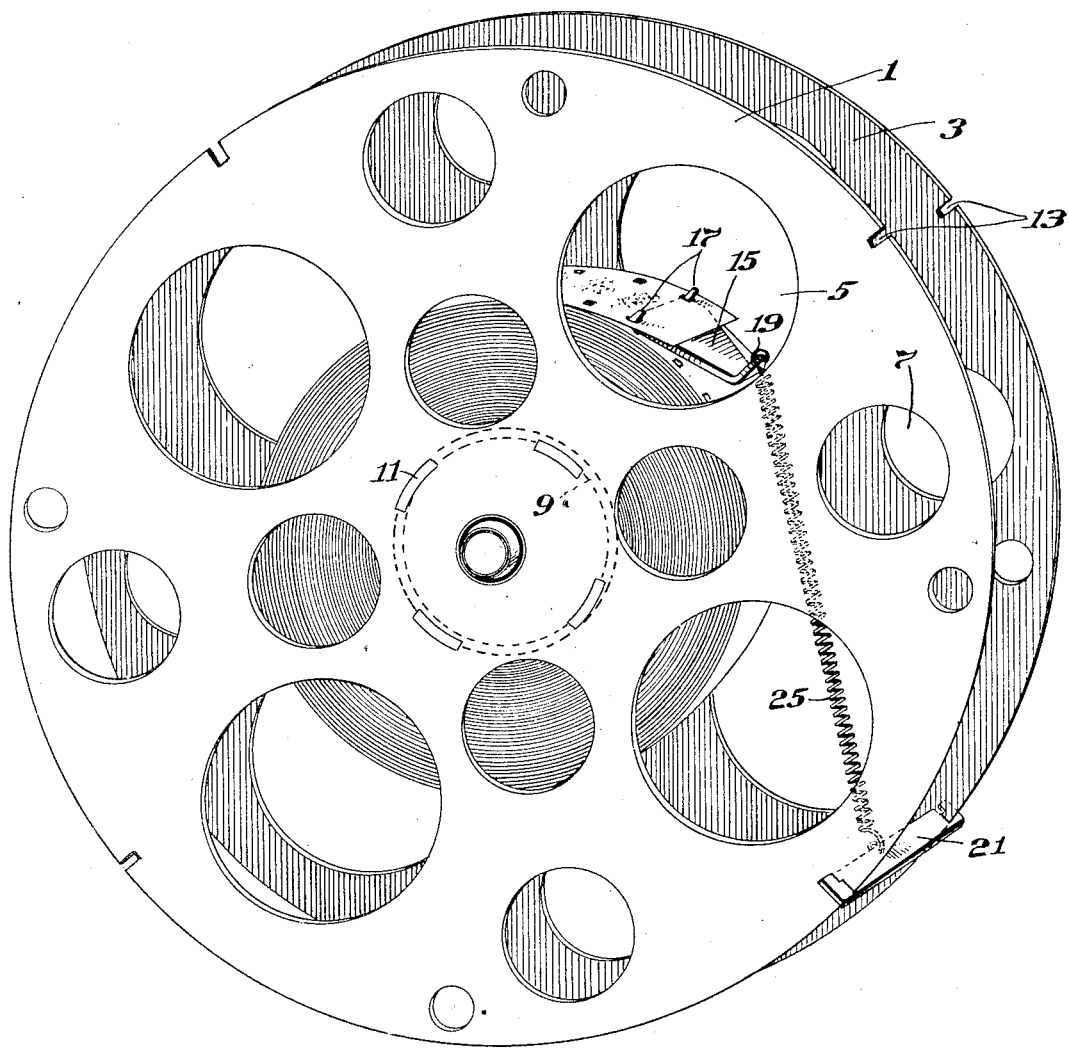
Figure 2:
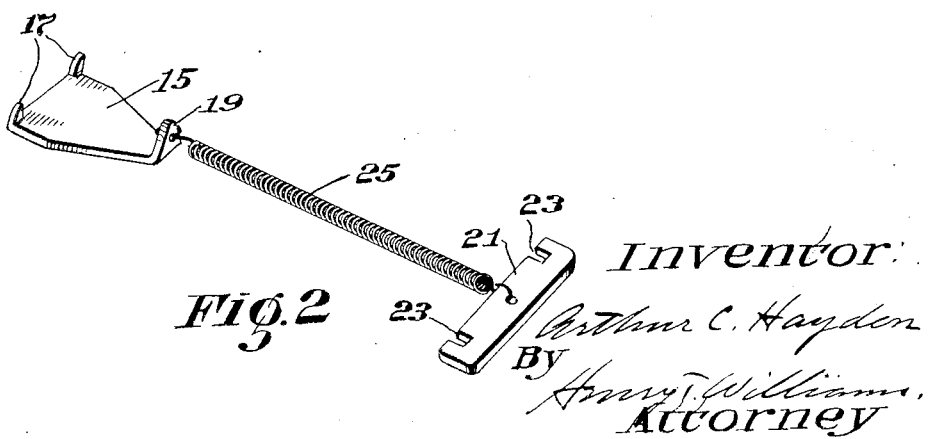

With the aforesaid and other purposes in view, the character of the invention may be best understood by reference to the following description of one good form thereof shown in the accompanying drawing, wherein:

Fig. 1 is a perspective view of a film reel and holding means for the free end of the film embodying the invention; and Fig. 2 is a perspective view of the holding means alone.

Referring to the drawings, the reel shown therein comprises a pair of circular plates 1 and 3 having large apertures 5 and smaller apertures 7 therein. Between and secured to the plates is a cylindrical hub 9 having lugs 11 projecting into similarly shaped holes in the plates, the ends of said lugs being upset to secure the plates to the hub. The plates are provided with pairs of notches 13 in the edges thereof and located at intervals circumferentially of the plates. In the present instance, four pairs of notches are provided, but the number thereof may be varied as desired.

The holding means, in the present instance, comprises a plate or member 15 having a pair of prongs or elements 17 inclined somewhat relatively to the plate for a purpose to be described. At the opposite end of the plate from the prongs is a lug 19 perpendicular to the plate. A bar or member 21 has a pair of notches 23 therein. Extending between and connected to the plate lug 19 and the bar 21 is a coil spring 25 of substantial length.

In use, when it is desired to hold the free end of the film on the reel, the plate 15 is presented to the film and the prongs 17 are inserted in a pair of holes of the film, preferably those nearest the end of the film. Then the bar is grasped and pulled outward, placing the coil spring under tension, and the bar is presented to the edges of the reel plates so that the bar notches 23 enter a pair of the reel plate notches 13.

The inclination of the prongs with respect to the plate is such that when the spring is placed under tension, there will be no liability of escape of the prongs, from the film holes, and thus the plate is positively connected to the film. Also, the bar is positively connected to the reel plates.

As stated, films expand or contract under temperature changes. The holding means disclosed herein lends itself advantageously to these conditions, since the coil spring will expand or contract to allow for the expansion and contraction of the film and always maintain the free end portion of the film in taut condition. If the film is wound so that the convolutions thereof are in compact relation, the holding means will maintain them in that relation. Preferably the bar should be placed in a pair of the reel plate notches sufficiently remote from the free end of the film to stretch the coil spring considerably. This will insure the holding of the free end of the film taut in case the film expands or lengthens to a substantial extent.

The holding means is simple and cheap in construction, and efficient in operation. It can be quickly and easily connected to the film and the reel and dis-connected therefrom. It requires very little alteration in the ordinary film reel, since it is merely necessary to cut the notches in the reel plates.

It will be understood that the invention is not limited to the specific embodiment shown, and that various deviations may be made therefrom without departing from the spirit and scope of the appended claims.

What is claimed is:—

1. The combination of a film reel having a pair of plates and a hub between the plates adapted to have a film wound thereon; and means for holding the free end of the film on the reel including a member having prongs adapted to enter holes in the film adjacent the edges thereof.

2. The combination of a film reel having a pair of plates and a hub between the plates adapted to have a film wound thereon; and means for holding the free end of the film on the reel including a member having means for connection with holes in the film, a member for engagement with the reel, and a coil spring between said members adapted to stretch or contract to hold the free end of the film taut on expansion and contraction of the film.

3. The combination of a film reel having a pair of plates with notches in the edges thereof and located at intervals circumferentially of the plates, and a hub between said plates adapted to have a film wound thereon; and means for holding the free end of the film on the reel including a member having elements for entering holes in the film adjacent the edges thereof, a bar for entry into a selected pair of the notches, and a coil spring connecting said member and bar.

ARTHUR C. HAYDEN.